United States Patent
Wong (10) Patent No.: US 10,607,396 B2
(45) Date of Patent: Mar. 31, 2020

(54) DYNAMIC RENDERING OF LOW FREQUENCY OBJECTS IN A VIRTUAL REALITY SYSTEM

(71) Applicant: HULU, LLC, Santa Monica, CA (US)

(72) Inventor: Tony Tin Fook Wong, San Francisco, CA (US)

(73) Assignee: HULU, LLC, Santa Monica, CA (US)

( * ) Notice: Subject to any disclaimer, the term of this patent is extended or adjusted under 35 U.S.C. 154(b) by 24 days.

(21) Appl. No.: 15/990,450

(22) Filed: May 25, 2018

(65) Prior Publication Data

US 2019/0362538 A1 Nov. 28, 2019

(51) Int. Cl.
*G06T 15/20* (2011.01)
*G06T 19/00* (2011.01)
*G09G 5/395* (2006.01)

(52) U.S. Cl.
CPC ............ *G06T 15/20* (2013.01); *G06T 19/006* (2013.01); *G09G 5/395* (2013.01); *G09G 2340/125* (2013.01); *G09G 2360/18* (2013.01)

(58) Field of Classification Search
CPC ....... G06T 15/20; G06T 19/006; G09G 5/395; G09G 2360/18; G09G 2340/125
See application file for complete search history.

(56) References Cited

U.S. PATENT DOCUMENTS 9,684,943 B2 * 6/2017 Park ........................ G06T 1/20
2018/0040301 A1 * 2/2018 Bae ....................... G09G 5/363

* cited by examiner

*Primary Examiner* — Robert J Craddock
(74) *Attorney, Agent, or Firm* — Fountainhead Law Group P.C.

(57) ABSTRACT

In one embodiment, the method renders a first set of objects at a first frame rate and a second set of objects at a second frame rate that is lower than the first frame rate. The second set of objects is stored in a buffer. Then, the method displays the second set of objects from the buffer for a number of frames based on the second frame rate while the rendered first set of objects is displayed at the first frame rate. When a visual change associated with the second set of objects over multiple frames meets a threshold, the method renders the second object at a third frame rate different from the second frame rate based on the visual change meeting the threshold.

20 Claims, 7 Drawing Sheets

DYNAMIC RENDERING OF LOW FREQUENCY OBJECTS IN A VIRTUAL REALITY SYSTEM

BACKGROUND

Rendering a virtual reality environment requires a lot of computational power. However, computational resources may be limited in computing devices, especially mobile devices. To render the virtual reality environment requires a very high frame rate, which is the number of frames that is rendered per second. The computing device may not have the computing resources available to render the virtual reality environment at such a high frame rate. However, rendering the virtual reality environment at a lower frame rate may cause lag for the viewer when viewing the virtual reality environment. The lag may make the virtual reality system unusable on the computing device.

DETAILED DESCRIPTION

Described herein are techniques for a virtual reality system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A virtual reality (VR) system renders a virtual reality environment in a user interface. The VR environment may include a first set of objects and a second set of objects. In some embodiments, the second set of objects may be objects that do not change that much from frame to frame. For example, the VR environment may include a "world" that forms a background scene of the user interface. In some examples, the background may be a living room scene that a user can navigate around the scene and select different objects displayed in the living room. The second set of objects in the living room may include seats, tables, windows, screens, televisions, and other objects that may not move that much from frame to frame.

The first set of objects may incur a larger amount of visual changes from frame to frame than the second set of objects. For example, the first set of objects may include a video that is playing in a window or a cursor that is used to select objects in the user interface. The video or cursor incurs changes to every frame that may need to be rendered to provide an acceptable visual experience. The VR environment may be different from other video experiences because the world may not change very much, but other objects may (e.g., a video playing in a television). The VR environment is thus different from playing a video that requires rendering each frame.

As mentioned in the Background, rendering the VR environment may require a large amount of computing resources and a high frame rate. Some embodiments render the VR environment using less computing resources and with a lower frame rate. The process of rendering the VR environment is improved especially on computing devices with limited computational resources. To lower the frame rate and use less computational resources, the VR system stores the second set of objects in a buffer. Then, in another frame, the VR system displays the second set of objects from the buffer while rendering the first set of objects again. This process renders the first set of objects at a first frame rate and the second set of objects at a second frame rate that is lower than the first frame rate. Because the second set of objects may not move much from frame to frame, displaying the second set of objects from the buffer decreases the computing resources needed to render the VR environment, but the display of the same second set of objects may not be noticeable to a user for a small number of frames (e.g., around four frames).

After a set number of frames, the VR system may render a new second set of objects and display the second set of objects in the user interface. Also, the VR system may determine when visual changes in the user interface increase and the second set of objects should be rendered at a higher frame rate. For example, when visual changes of the VR environment increase above a threshold from frame to frame, the VR system may determine that the second set of objects should rendered because the visual changes have increased to a point where it may be noticeable to the user if the second set of objects is displayed from the buffer for the presently configured frame rate. Accordingly, the VR system dynamically determines from visual changes when to increase or decrease the frame rate for the second set of objects.

System

Figure 1:
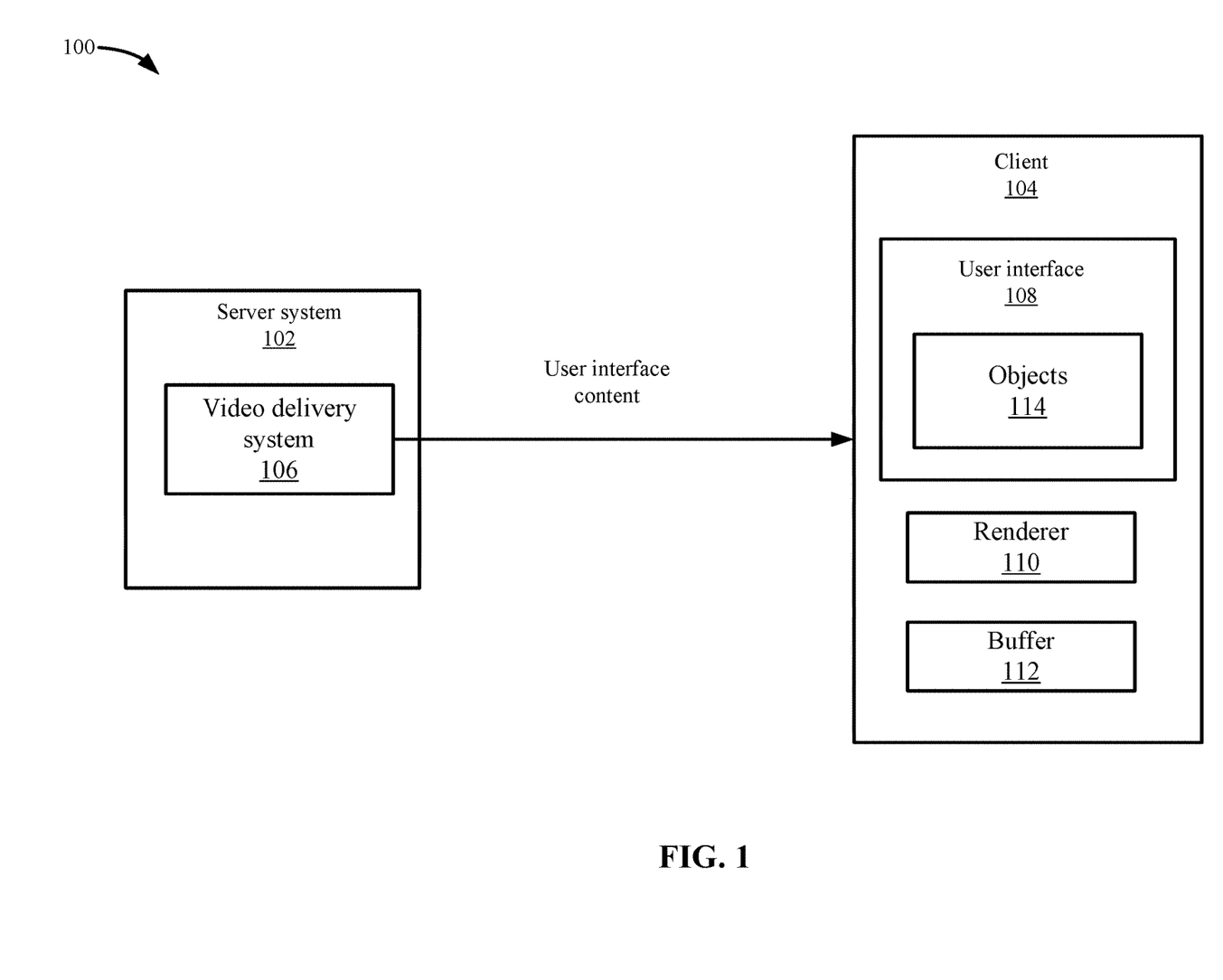
FIG. 1 depicts a simplified system of a method for generating a virtual reality (VR) environment in a user interface according to some embodiments.

FIG. 1 depicts a simplified system 100 of a method for generating a VR environment in a user interface according to some embodiments. In some embodiments, a video delivery service may provide a VR experience for streaming video. The video delivery service may offer a library of VR videos that users can request on-demand or stream live. A video server may send the VR videos to a client 104. For example, the video server may be part of a content delivery network and client 104 may be different computing devices that include media players, such as a living room device, smartphone, tablet device, set-top-box, television, etc.

The user can select and play the videos using user interface 108. System 100 includes a server system 102 that sends user interface content to one or more clients 104. In some embodiments, the user interface content may be used to display the VR environment at client 104. The VR environment may display 360 degree content (e.g., three dimensional content) or two dimensional content on a user interface 108 of client 104. However, when playing the two dimensional content, the VR environment is three dimensional. The user can use a VR system to display the VR environment in user interface 108. For example, the VR system may include a head set and an application running on client 104 that are used to view and display the VR environment. The user can use the headset to view different portions of the VR environment.

Different methods of generating the VR environment may be appreciated. In some embodiments, a video processor including an encoding system (not shown) receives spherical content in a format, such as rectangular two-dimensional (2D) images in an "equirectangular" format, from a content provider. The encoding system decodes the equirectangular data into face images for a map, such as a cube map. The face images include the content from the original spherical content. A cube map arranges the face images on a sheet that can be encoded. The cube map can then be decoded when presented to a user by placing the face images on an object, such as a cube structure. A collection of six face images making up a cube map may be better suited for compression and offers low levels of distortions to the images compared with using the equirectangular image directly (since the cube map directly represents the view from the user), whereas the equirectangular image is a mapping from sphere to plane and thus has inherent distortion. Then, the encoding system encodes the cube map of the video. The encoding system may be a standard encoder using one of the encoding standards. The video processor can then send the compressed video stream to client 104. Although the above method of sending VR videos is described, other formats for sending 360 degree content may be appreciated, such as encoding the equirectangular image itself and streaming it to the client.

Three-dimensional (3D) hardware in client 104 includes a decoder (not shown) and renderer 110. The decoder decodes the compressed video that was encoded as the cube map, and decodes the cube map into the cube format at rendering time. For example, the six face images are decoded. Then, renderer 110 can render the face images on using the cube structure. The rendered face images provide the 3D video to a user viewing the video. A user using client 104 can then view the spherical content using client 104. In one embodiment, the spherical content is presented on an application running on client 104. For example, the content is placed around a camera and the user is situated inside the cube and can view the content in 360 degrees. The user can then use the VR system (e.g., headset) to move a focus point (e.g., cursor) around the 3D content and select objects. Different portions of video may then be played according to the selection.

Server system 102 may include a video delivery system 106 that delivers videos to client 104. For example, the user may use client 104 to select videos to play on user interface 108. During the selection, the user may display the VR environment to allow the user to select the videos and also perform other actions. The VR environment may include a "world," which may be a background-type scene. In some embodiments, the "world" is a living room scene that includes objects such as windows, televisions, etc., that the user can navigate to perform different actions, such as select videos, search for videos, etc.

Renderer 110 can render the VR environment. For example, renderer 110 receives user interface content and can use that information to render and display objects 114 on user interface 108. Video rendering is the process by which renderer 110 processes information from the user interface content and uses that information to produce and display the VR environment. As discussed above, the rendering process may take a large amount of computing resources. Also, when displaying a VR environment, which includes a 360 degree view, additional computing resources are needed compared to when a two-dimensional display of video is provided.

In some embodiments, renderer 110 may render a first set of objects at a first frame rate, such as every frame, in user interface 108. For example, the first set of objects may include a video that is playing in a window in user interface 108. Other objects may also include a cursor that moves a large amount from frame to frame. The first set of objects may be rendered every frame because the visual changes of the first set of objects may cause the display to be jumpy (e.g., not move smoothly) or lag if these objects are not displayed every frame. The visual changes may be movement of an object, or other changes such as lighting variation.

Renderer 110 also renders a second set of objects at a second frame rate lower than the first frame rate in user interface 108 that may not generally move as much as the first set of objects. For example, the second set of objects may be part of the "world" that forms the VR environment. In some embodiments, some objects in the "world" may be part of the first set of objects that are rendered every frame. These objects may be objects that may experience a large amount of change that is above a threshold. Because the "world" may not experience as many changes, renderer 110 may not render the "world" every frame or at the same frame rate as the first set of objects. Rather, renderer 110 may store the rendered second set of objects in buffer 112. Then, instead of rendering another version of the second set of objects in a next frame, renderer 110 displays the rendered second set of objects from buffer 112 in the next frame along with a newly rendered first set of objects. The display of the second set of objects from buffer 112 uses less computing resources than rendering the second set of objects because rendering the second set of objects requires a large amount of computational resources to render multiple meshes with complex shaders, whereas the display of the second set of objects involves merely a copy operation with a less complex shader from the buffer to screen. A shader is a type of computer program that may be used for shading (e.g., the production of appropriate levels of light, darkness, and color within an image). Shaders calculate rendering effects to apply visual effects to the video, such as shading (e.g., levels of light, darkness, and color). Renderer 110 may continue to display the second set of objects from buffer 112 for a number of frames, such as four frames. Then, renderer 110 may render a new second set of objects. The newly-rendered second set of objects is again stored in buffer 112 and renderer 110 can display the second set of objects from buffer 112 for another four frames.

Renderer 110 can display the second set of objects from buffer 112 for a number of frames because the second set of objects may not change very much from frame to frame. For example, the "world" of the VR environment may not change very much as these objects may be displayed without much visual change from frame to frame (e.g., a seat or couch in the living room does not move that much over a few frames). This aspect of the VR environment allows the buffering and display of the second set of objects without noticeably affecting the viewing experience. However, if renderer 110 detects that the content in user interface 108 has changed by an amount that is above a threshold, which could mean that a high amount of visual change has occurred, renderer 110 may render a new second set of objects and display the new second set of objects instead of displaying the second set of objects from buffer 112. Accordingly, renderer 110 may render the second set of objects based on visual changes rather than based on time. Displaying the second set of objects from buffer 112 may decrease the amount of computing resources needed and may also increase the frame rate because the complete rendering of the second set of objects can be removed from several frames. The frame rate is increased because renderer 110 performs less rendering operations and can thus display more frames per second. The increase in the frame rate and decrease in the computing resources used improves the display of the VR environment at client 104.

Although two sets of objects are discussed, other sets of objects may also be appreciated. For example, the third set of objects may be rendered at a different frame rate from the first set of objects and the second set of objects.

Rendering Path

Figure 2:
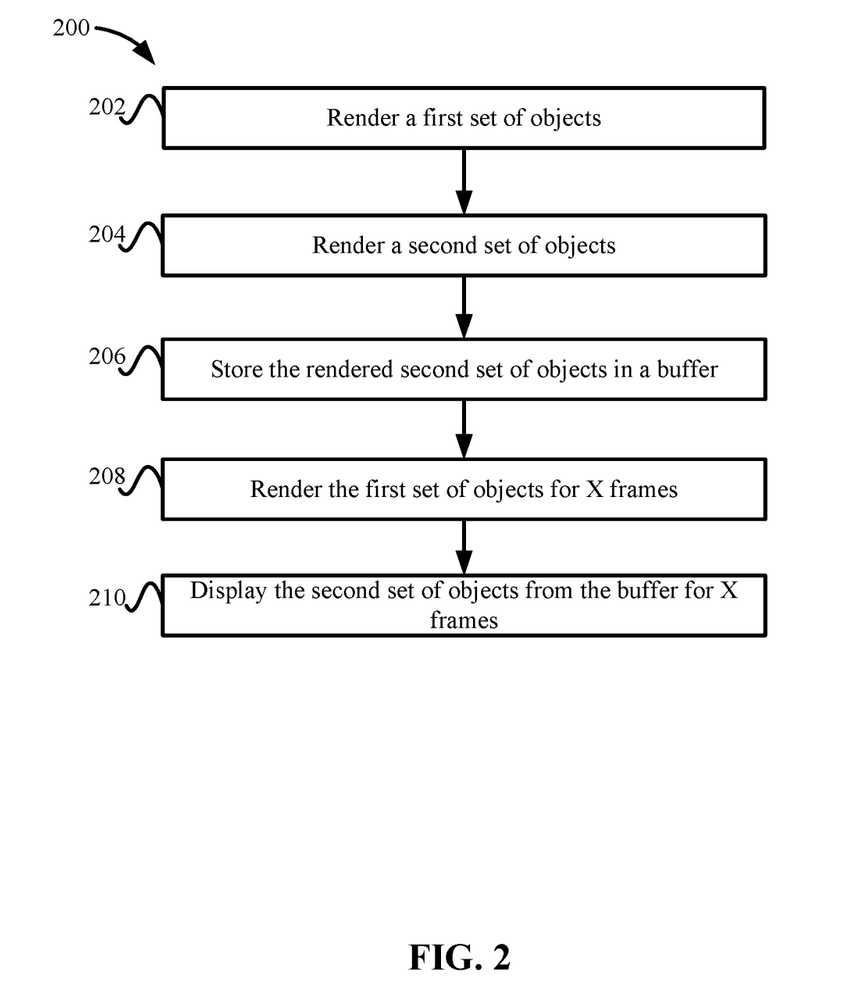
FIG. 2 depicts a simplified flowchart of a method for rendering the VR environment according to some embodiments.

FIG. 2 depicts a simplified flowchart 200 of a method for rendering a VR environment according to some embodiments. At 202, renderer 110 renders a first set of objects in user interface 108. The first set of objects may be defined by a user because they contain a high amount of visual changes that may be above a certain threshold. Also, the first set of objects may be defined as every object other than those objects that have been tagged to have low frequency changes (typically but not necessarily the world of the VR environment). In other embodiments, all objects may be tagged with identifiers that indicate a set of objects in which the objects belong. The tagging may be manual or automatic. The automatic tagging may be performed by analyzing the visual changes for each object and comparing the visual changes to a threshold that identifies the object as being in the first set of objects or the second set of objects.

At 204, renderer 110 renders a second set of objects that includes objects that are defined as having a lower frame to frame visual change than the first set of objects. For example, renderer 110 may render the world as the second set of objects. Then, at 206, renderer 110 stores the rendered second set of objects in buffer 112. The rendered second set of objects does not need to be rendered again when retrieved from buffer 112. Rather, renderer 110 can display the second set of objects from buffer 112 in a frame.

When a next frame is encountered, at 208, renderer 110 renders the first set of objects at a first frame rate. For example, if the frame rate is every frame, renderer 110 renders the first set of objects every frame. Then, at 210, renderer 110 displays the second set of objects from buffer 112 for X frames, such as for four frames. Accordingly, renderer 110 renders the first set of objects every frame in the X frames, but displays the same second set of objects from buffer 112 for the X frames without performing another rendering of the second set of objects. The rendering of the second set of objects is thus at a second frame rate that is lower than the first frame rate used for rendering the first set of objects. For example, if X frames is four frames, the second frame rate is four times slower than the first frame rate. The above process captures the change from frame to frame for the first set of objects, but displays the same second set of objects. The display of the same second set of objects for X frames may be acceptable to a user viewing user interface 108 because the second set of objects may not be experiencing much visual changes during the X frames.

After X frames, the process reiterates to 202 where renderer 110 renders the first set of objects and the second set of objects again and renderer 110 stores the second set of objects in buffer 112. The process starts over where the first set of objects is rendered every frame for another X frames and the second set of objects is displayed from buffer 112 for another X frames.

Figure 3:
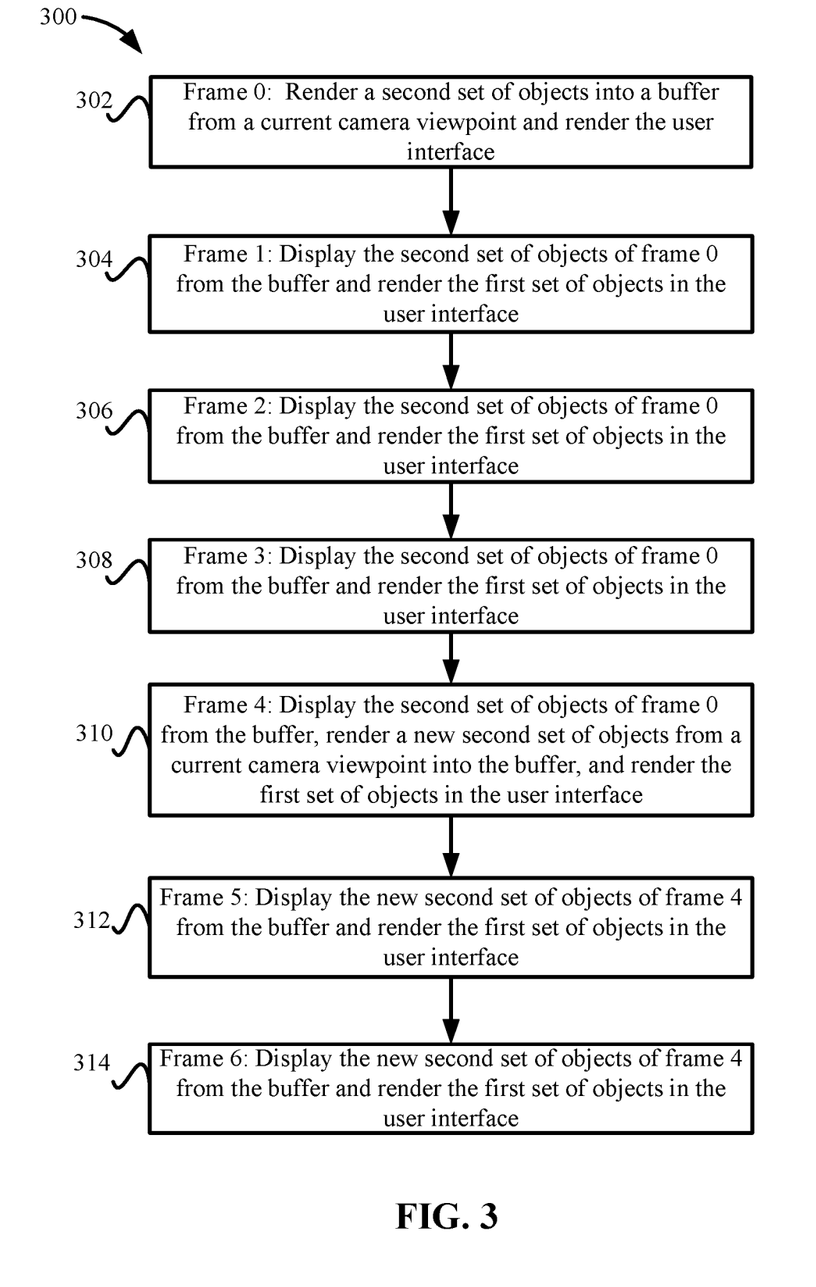
FIG. 3 shows a sequence of frames according to some embodiments.

FIG. 3 shows a sequence of frames according to some embodiments. The second set of objects are described as a world view and the first set of objects are every other object that forms what is displayed on user interface 108 in this example. For example, rendering the user interface renders and displays the first set of objects in addition to displaying the second set of objects from the world view. At 302, in a frame 0, renderer 110 renders the second set of objects into buffer 112 from a current camera viewpoint and renders the user interface. The user interface may be the view (e.g., video screen) in which the first set of objects and the second set of objects are rendered within. In some embodiments, the user interface may be part of the first set of objects. Frame 0 may be before a first frame is displayed in user interface 108. The current camera viewpoint may be the viewpoint of the camera that represents where a user is looking in the VR environment. For example, the user may be looking at a certain portion of the 360 degree VR environment. It is possible that the first set of objects and the second set of objects are displayed in the user interface in frame 0 in other examples.

At 304, at a frame 1, renderer 110 displays the second set of objects of frame 0 from buffer 112 and renders the first set of objects in the user interface. This displays the world view in addition to any other objects that are rendered for user interface 108. In some embodiments, renderer 110 applies high dynamic range (HDR) to the world view in buffer 112 before displaying the world view in user interface 108. High dynamic range increases the dynamic range from a standard dynamic range. The dynamic range may be the range of values in the signals that are possible. In some embodiments, renderer 110 does not have to apply HDR to the video. HDR is applied to a buffer to perform graphical processing, such as blooming. Blooming is a computer graphics effect used to reproduce an imaging artifact of real-world cameras. The effect produces fringes (or feathers) of light extending from the borders of bright areas in an image, contributing to the illusion of an extremely bright light overwhelming the camera or eye capturing the scene. The HDR processing may process the rendering of the second set of objects over several (e.g., two) frames, which may distribute the resource usage or increase the performance by splitting the rendering over multiple frames instead of performing the rendering over a single frame. HDR may not applied to the display of user interface 108.

At 306, in frame 2, renderer 110 displays the second set of objects of frame 0 from buffer 112 and renders the first set of objects in user interface 108. For example, the same world view from frame 0 is used and renderer 110 renders objects other than the world view again in frame 2. Rendering the first set of objects may involve operations similar to those performed to render the second set of objects. The rendering of the first set of objects is different from displaying a previously rendered first set of objects.

At 308, in frame 3, renderer 110 again displays the second set of objects from frame 0 from buffer 112 and renders the first set of objects in user interface 108. This again uses the same world view, but renders objects other than the world view again in user interface 108.

At 310, renderer 110 has reached a frame count that requires the second set of objects to be rendered again. In frame 4, renderer 110 displays the second set of objects of frame 0 from buffer 112 and renders the first set of objects in user interface 108. Also, at 310, renderer 110 renders a new second set of objects from the current camera viewpoint into buffer 112. For example, the user may have altered the camera viewpoint to view a different portion of the world.

Renderer 110 renders the new world view for the new camera viewpoint into buffer 112.

At 312, in frame 5, renderer 110 displays the new second set of objects of frame 4 from buffer 112 and renders first set of objects in user interface 108. Also, at 314, in frame 6, renderer 110 displays the new second set of objects of frame 4 from buffer 112 and renders the first set of objects in user interface 108. This process continues where after every four frames, renderer 110 renders a new world view from a current camera viewpoint.

In some embodiments, the time to render a frame is reduced when the world view is displayed from buffer 112. For example, the rendering time at frame 0 may be X milliseconds. Then, in frame 1, the rendering time is shorter than frame 0 because the world view is displayed from buffer 112 and not rendered again. The frame processing time also is lower for the next two frames, and the processing time may be even lower than frame 2 because HDR does not have to be applied to the second set of objects again.

In frame 4, when renderer 110 renders a new second set of objects, the processing time may increase again. Then, in frames 5, 6, and so on, the frame processing time is lower. This is in comparison to the process described in the Background, where the frame processing time is constant for every frame because the world view is rendered in every frame. In some embodiments, a frame rate of 45 frames per second is achieved using some embodiments, as compared to 30 frames per second if the world view is rendered for every frame.

In addition to rendering a new second set of objects after X number of frames, renderer 110 may render a new second set of objects when a visual change between the frames occurs that is above a threshold. Different factors may be measured to determine when the threshold is met. For example, the factors include how fast the user is rotating the headset, and if the headset is moved quickly above a threshold, then this may meet a threshold. The light level is also monitored, and if the lighting changes quickly then this change may also meet a threshold. Movable objects in the world that are actually moving may also meet a threshold. In other embodiments, the change may be measured from only objects from the second set of objects.

Figure 4:
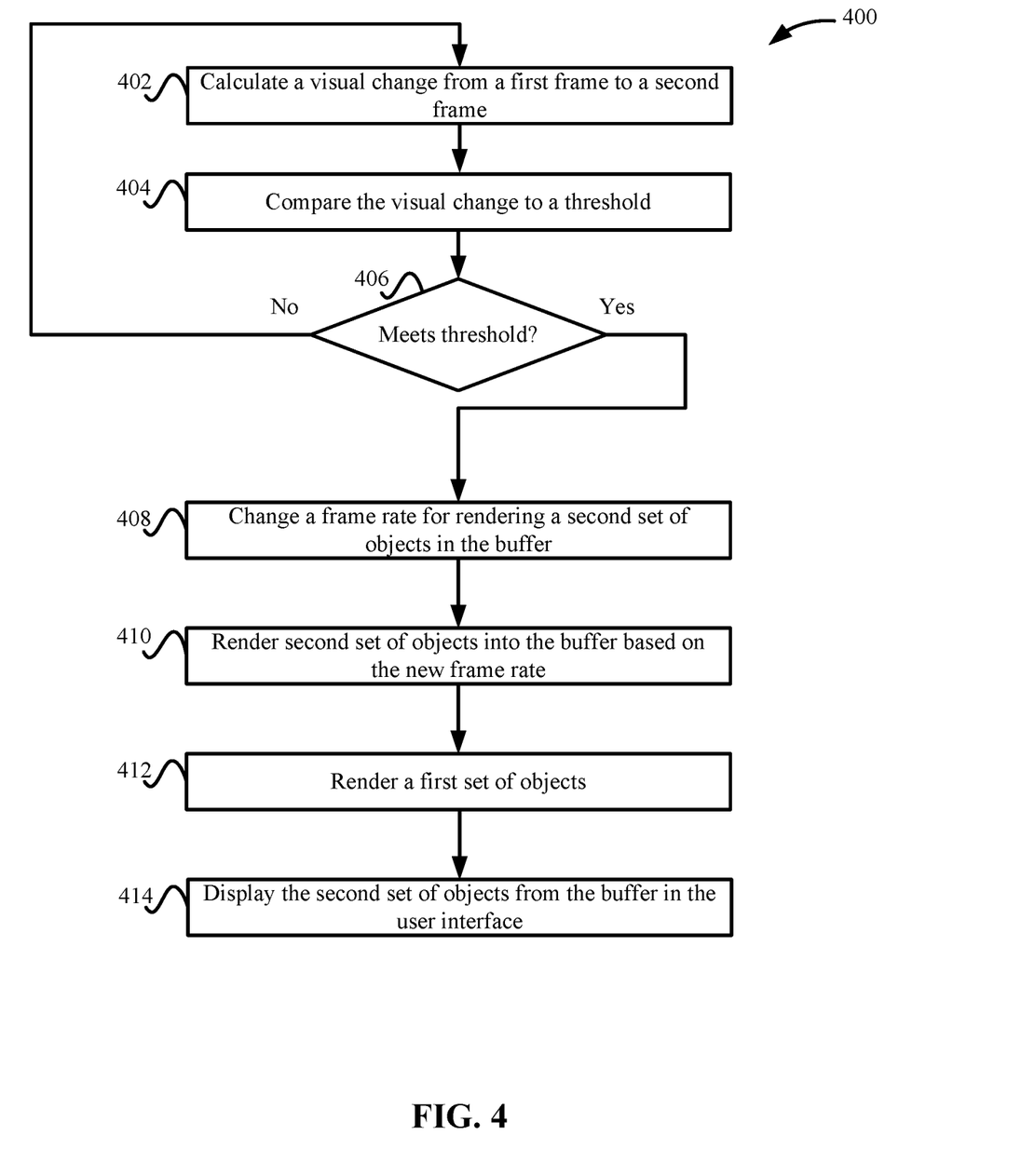
FIG. 4 depicts a simplified flowchart of a method for determining when a change in a user interface causes a change to the frame rate for rendering the second set of objects according to some embodiments.

FIG. 4 depicts a simplified flowchart 400 of a method for determining when a change in user interface 108 causes a change to the frame rate for rendering the second set of objects according to some embodiments. The frame rate may be the rate at which renderer 110 renders a new second set of objects. For example, every four frames, renderer 110 is configured to render a new second set of objects. However, if renderer 110 detects a visual change in user interface 108, such as between frames or in the world view, renderer 110 can override the set frame rate for the second set of objects, and render a new second set of objects. For example, a frame-to-frame change that may trigger a dynamic change in the frame rate may include events that involve objects that move or are animated in user interface 108, lighting changes, or the user rotating the camera view.

At 402, renderer 110 calculates a visual change from a first frame to a second frame. The visual change may be measured based on different factors as discussed above.

At 404, renderer 110 compares the visual change to a threshold. For example, from one frame to a next frame, renderer 110 determines a delta of the change in content based on different factors. The threshold may represent an amount of change, such as the change may change any percentage of user interface 108. For example, the threshold may be a change of more than 10% of the content of consecutive frames. In some embodiments, each factor may be compared to a respective threshold. Also, the factors may be combined and the result compared to a threshold. Other variations may also be appreciated.

At 406, renderer 110 determines if the visual change meets a threshold. Meeting the threshold may mean that the visual change is equal to or above the threshold, but other ways of meeting the threshold may be appreciated, such as the visual change being less than the threshold. If the visual change does not meet the threshold, the process reiterates to 402 to continue to test whether the visual change between frames meets the threshold.

At 408, if the visual change meets the threshold, renderer 110 changes a frame rate. The change in the frame rate may depend on the size of the visual change. For example, when the delta of the visual change increases from frame to frame, renderer 110 can decrease the time between rendering a new second set of objects (e.g., increase the frame rate). The time may be decreased by certain interval or the frame rate increased by certain intervals (e.g., a five frame per second increase). The visual change increases the number of times the second set of objects is rendered over a period. Ultimately, if the delta becomes large enough, renderer 110 renders the second set of objects every frame. Also, when a lower delta occurs between consecutive frames, then the time between rendering the second set of objects may be increased, such as by decreasing the frame rate by N frames per second (e.g., a five frame per second decrease). The visual change decreases the number of times the second set of objects is rendered over a period.

At 410, renderer 110 renders the second set of objects into buffer 112 based on the new frame rate. Then, at 412, renderer 110 renders a first set of objects. Also, at 414 renderer 110 displays the second set of objects from buffer 112 in user interface 108. This renders a new world view in user interface 108 that may represent the change that has occurred. Accordingly, when a visual change between frames is occurring, renderer 110 may increase the frame rate of rendering the world view to capture the visual change. This may increase the rendering of the world view when a visual change of the world view is occurring. However, when the visual change reduces or stops, then renderer 110 may go back to rendering the world view every X frames.

Client Example

Figure 5:
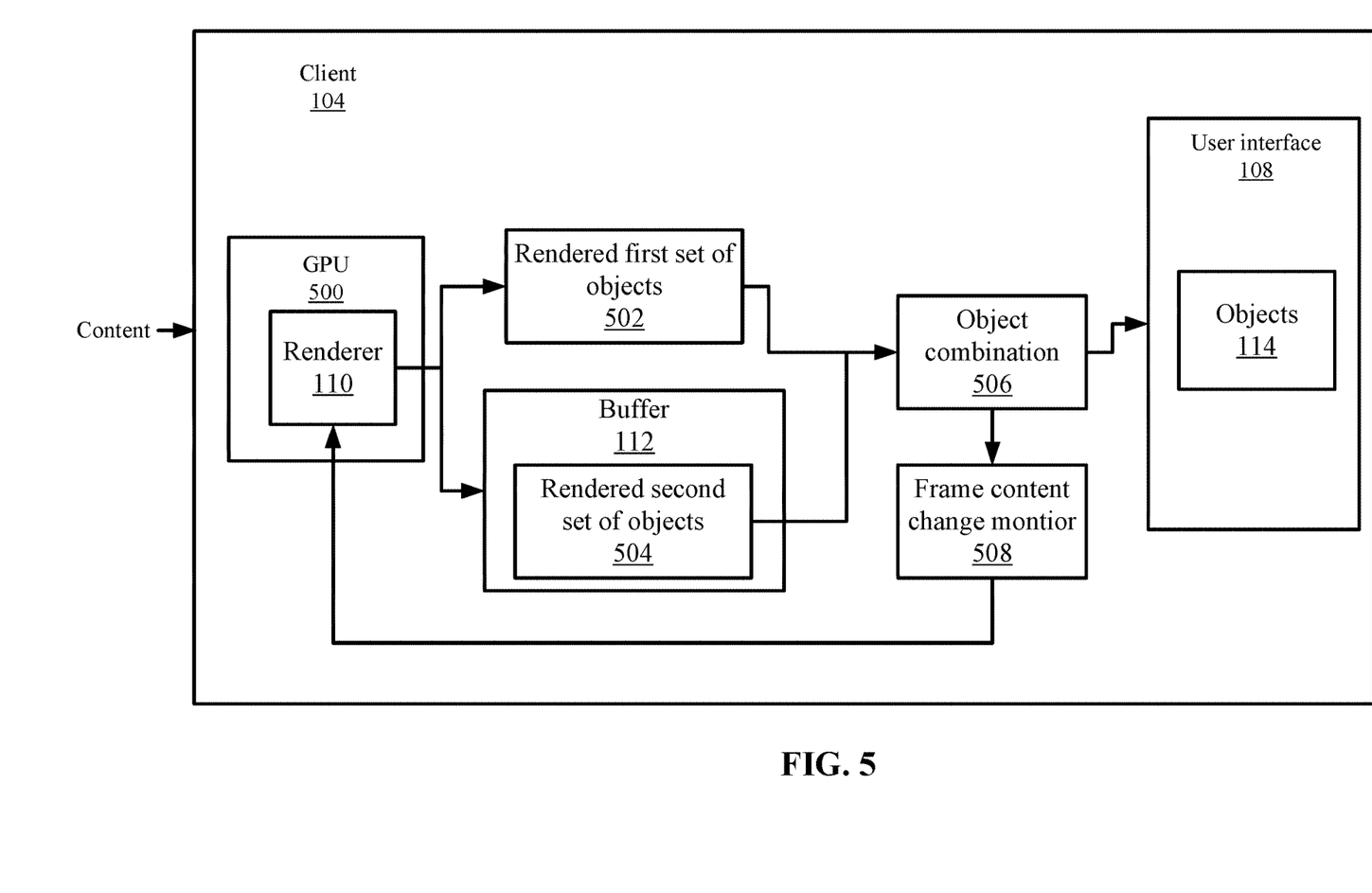
FIG. 5 depicts a more detailed example of a client according to some embodiments.

FIG. 5 depicts a more detailed example of client 104 according to some embodiments. Client 104 includes a graphics processing unit (GPU) 500 that performs the rendering of user interface 108. The GPU is a computer processor specialized for processing graphics. Although a GPU is described, other computer processors may be used to perform the rendering operations, such as a main computer processing unit (CPU). GPU 500 includes renderer 110, which can render content received from server system 102.

Renderer 110 renders the first set of objects 502 and also renders the second set of objects 504. Renderer 110 stores second set of objects 504 in buffer 112. In some embodiments, since the first set of objects is rendered every frame, renderer 110 does not need to store the first set of objects in a buffer before displaying the first set of objects. However, the first set of objects may be buffered if rendered before a time to display the first set of objects.

Then, renderer 110 combines the first set of objects 502 and second set of objects 504 at object combination block 506. The combination generates user interface 108, which displays objects 114. For example, as discussed above, user interface 108 displays the VR environment.

A frame content change monitor 508 monitors the content of the frames and can determine when a visual change in consecutive frames meets a certain threshold. When this occurs, frame content change monitor 508 notifies renderer 110. Renderer 110 can then alter the frame rate of rendering a second set of objects 504. For example, frame content change monitor 508 may determine a new frame rate for rendering second set of objects 504.

Conclusion

Accordingly, some embodiments provide a system that may optimize the rendering in client 104. By de-coupling the rendering of a second set of objects from a function of time (e.g., every frame) to a function of visual change (e.g., if the object moves), the rendering process is optimized and the frame rate is increased because the complete rendering of objects can be removed from several frames. The rendering process saves rendering computational resources at client 104. This also increases the performance of rendering a VR environment because the visual display may suffer from fewer errors, such as lag. In some examples where client 104 includes limited computing resources, such as in a mobile device, an application providing the VR environment may not be able to display the VR environment without experiencing lag. Or client 104 may display the VR environment at a low frame rate that is disturbing to a user viewing the VR environment. With the higher frame rate enabled by some embodiments, a client that has lower computing resources can still display the VR environment at a higher frame rate needed for acceptable performance.

System

Figure 6:
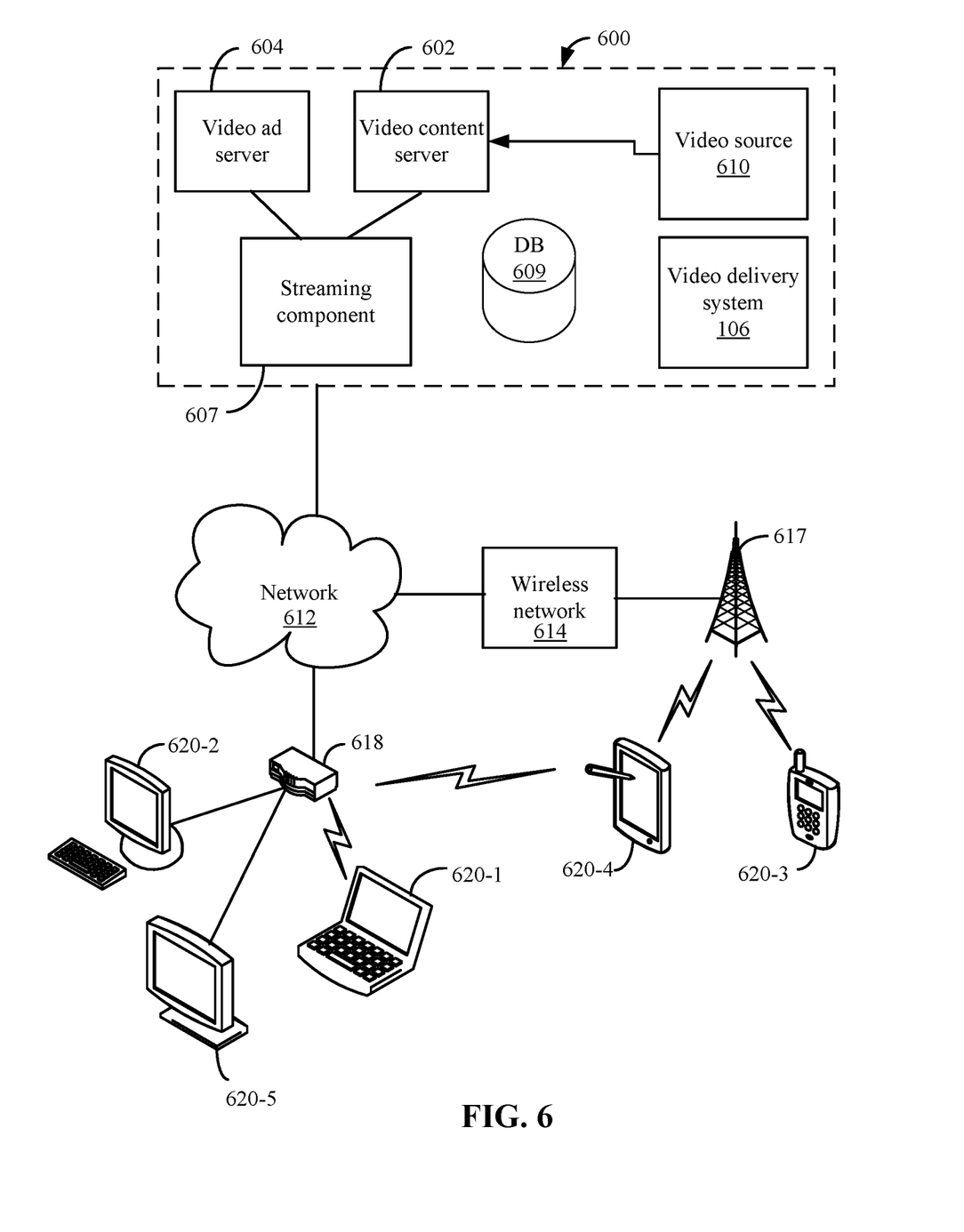
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include video delivery system 106.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
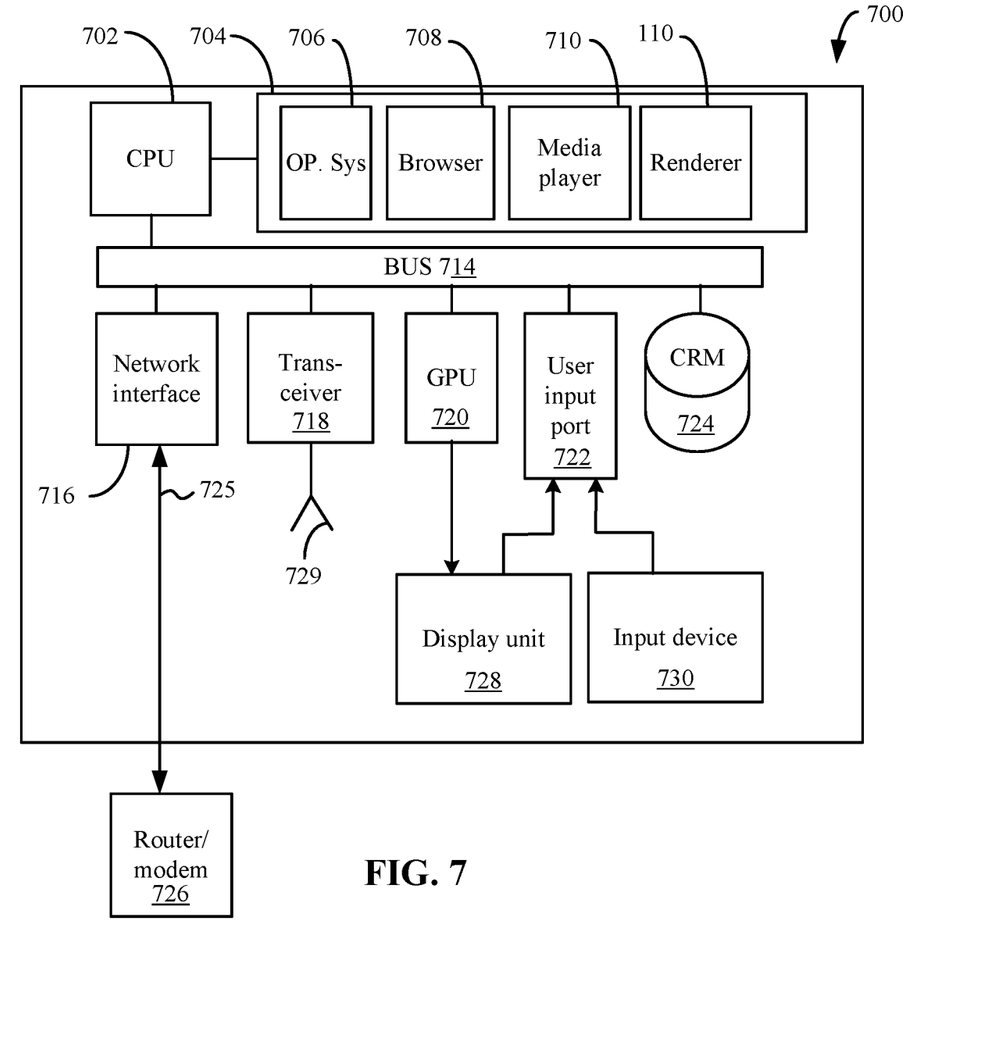
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include renderer 110. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   rendering, by a computing device, a first set of objects at a first frame rate and a second set of objects at a second frame rate that is lower than the first frame rate;
   storing, by the computing device, the second set of objects in a buffer;
   displaying, by the computing device, the second set of objects from the buffer for a number of frames based on the second frame rate while displaying the rendered first set of objects at the first frame rate;
   determining, by the computing device, when a visual change associated with the second set of objects over multiple frames meets a threshold; and
   rendering, by the computing device, the second set of objects at a third frame rate different from the second frame rate based on the visual change meeting the threshold.

2. The method of claim 1, wherein the first frame rate renders the first set of objects for every frame.

3. The method of claim 1, wherein the second frame rate renders the second set of objects for less than every frame.

4. The method of claim 1, wherein a user interface displays a virtual reality environment that includes a combination of the first set of objects and the second set of objects.

5. The method of claim 4, wherein the second set of objects are objects designated as having visual changes that are lower than the first set of objects in the virtual reality environment.

6. The method of claim 1, wherein the visual change is caused by rotation of a camera in a virtual reality system in a 360 degree virtual reality environment.

7. The method of claim 1, wherein the first set of objects comprise a video being played.

8. The method of claim 1, wherein the second set of objects comprise a world view in a virtual reality environment, the world view being a background scene that the user can navigate in the virtual reality environment.

9. The method of claim 1, wherein determining when the visual change of the user interface meets the threshold comprises:
   calculating a visual change between a first frame and a second frame for the user interface for one or more factors; and
   comparing the visual change for the one or more factors to the threshold.

10. The method of claim 1, further comprising:
    changing the second frame rate to the third frame rate based on an amount of visual change between a first frame and a second frame.

11. The method of claim 10, wherein the second frame rate is increased to the third frame rate to render the second set of objects more frequently based on the amount of visual change between the first frame and the second frame increasing.

12. The method of claim 10, wherein the second frame rate is decreased to the third frame rate to render the second set of objects less frequently based on the amount of visual change between the first frame and the second frame decreasing.

13. The method of claim 1, further comprising:
    determining when the visual change of the user interface does not meet the threshold; and
    decreasing the third frame rate based on an amount of visual change between a first frame and a second frame.

14. A non-transitory computer-readable storage medium containing instructions, that when executed, control a computer system to be configured for:
    rendering a first set of objects at a first frame rate and a second set of objects at a second frame rate that is lower than the first frame rate;
    storing the second set of objects in a buffer;
    displaying the second set of objects from the buffer for a number of frames based on the second frame rate while displaying the rendered first set of objects at the first frame rate;

determining when a visual change associated with the second set of objects over multiple frames meets a threshold; and rendering the second set of objects at a third frame rate different from the second frame rate based on the visual change meeting the threshold.

15. A method comprising:

rendering, by a computing device, a first set of objects for each of a first number of frames;

rendering, by the computing device, a second set of objects for a first frame;

storing, by the computing device, the second set of objects in a buffer;

for each of the first number of frames, displaying, by the computing device, the second set of objects from the buffer while displaying the rendered first set of objects that were rendered for each respective frame in the first number of frames;

after the first number of frames, rendering, by the computing device, the second set of objects for a second frame that is after the first number of frames;

storing, by the computing device, the second set of objects in the buffer;

rendering, by the computing device, the first set of objects for each of a second number of frames; and for each of the second number of frames, displaying, by the computing device, the second set of objects from the buffer while displaying the rendered first set of objects that were rendered for each respective frame in the second number of frames.

16. The method of claim 15, further comprising:

determining when a visual change for at least one of the first set of objects and the second set of objects over multiple frames meets a threshold; and rendering the second set of objects prior to an end of the first number of frames or the second number of frames based on the visual change meeting the threshold.

17. The method of claim 15, wherein the second set of objects is rendered based on a camera view of a virtual reality environment at the first frame and the second frame.

18. The method of claim 15, wherein the first set of objects are rendered based on a first frame rate and the second set of objects are rendered based on a second frame rate lower than the first frame rate.

19. The method of claim 18, wherein the second frame rate is increased to a third frame rate to render the second set of objects more frequently based on an amount of visual change between frames in at least one of the first number of frames or the second number of frames increasing.

20. The method of claim 18, wherein the second frame rate is decreased to a third frame rate to render the second set of objects less frequently based on an amount of visual change between frames in at least one of the first number of frames or the second number of frames decreasing.

* * * * *